United States Patent
Mock

(10) Patent No.: US 11,904,325 B2
(45) Date of Patent: Feb. 20, 2024

(54) METHOD AND DEVICE FOR THE TREATMENT OF GRANULAR GRINDING STOCK OR GRINDING STOCK MIXTURES

(71) Applicant: Wolfgang Mock, Otzberg-Lengfeld (DE)

(72) Inventor: Wolfgang Mock, Otzberg-Lengfeld (DE)

(*) Notice: Subject to any disclaimer, the term of this patent is extended or adjusted under 35 U.S.C. 154(b) by 226 days.

(21) Appl. No.: 17/429,533

(22) PCT Filed: Jan. 30, 2020

(86) PCT No.: PCT/EP2020/052201
§ 371 (c)(1),
(2) Date: Aug. 9, 2021

(87) PCT Pub. No.: WO2020/177955
PCT Pub. Date: Sep. 10, 2020

(65) Prior Publication Data
US 2022/0134351 A1    May 5, 2022

(30) Foreign Application Priority Data
Mar. 4, 2019    (DE) .................. 10 2019 105 427.3

(51) Int. Cl.
*B02C 25/00*    (2006.01)
*A47J 42/44*    (2006.01)
(Continued)

(52) U.S. Cl.
CPC .............. *B02C 25/00* (2013.01); *A47J 42/44* (2013.01); *A47J 42/50* (2013.01)

(58) Field of Classification Search
CPC .......... B02C 25/00; B02C 23/38; A47J 42/38; A47J 42/40; A47J 42/42; A47J 42/44; A47J 42/46; A47J 42/50
See application file for complete search history.

(56) References Cited

U.S. PATENT DOCUMENTS

| 7,464,888 B2 | 12/2008 | Malykke .................. 241/36 |
| 9,591,862 B2 | 3/2017 | Kuempel et al. |

(Continued)

FOREIGN PATENT DOCUMENTS

| DE | 102016107834 A1 | 11/2017 |
| WO | WO2005003022 A1 | 1/2005 |

(Continued)

OTHER PUBLICATIONS

The Notification Concerning Transmittal of International Preliminary Rpeort on Patentability (Chapter I of the Patent Cooperation Treaty), in English, dated Sep. 16, 2021, which was issued by the International Bureau of WIPO in Applicant's corresponding international PCT application having Serial No. PCT/EP2020/052201, filed on Jan. 30, 2020.

(Continued)

*Primary Examiner* — Matthew Katcoff
*Assistant Examiner* — Mohammed S. Alawadi
(74) *Attorney, Agent, or Firm* — Bodner & Bodner, PLLC; Gerald T. Bodner; Christian P. Bodner

(57) ABSTRACT

The invention relates to a method and a device for treating granular grinding stock or grinding stock mixtures by way of controlled mechanical size reduction by means of a grinding mill or a combination of several grinding mills. The actual grinding process is controlled by externally provided data. The data is saved in a data memory unit that is connected to the packaging of the grinding stock, namely directly.

10 Claims, 1 Drawing Sheet

(51) Int. Cl.
*A47J 42/50* (2006.01)
*A47J 31/42* (2006.01)
*A47J 42/40* (2006.01)
*A47J 42/46* (2006.01)
*A47J 42/38* (2006.01)

(56) References Cited

U.S. PATENT DOCUMENTS

| | | | | |
|---|---|---|---|---|
| 2010/0154645 | A1* | 6/2010 | Nosler | A47J 31/36 99/299 |
| 2014/0263780 | A1 | 9/2014 | Day, Jr. | 241/63 |
| 2018/0000108 | A1* | 1/2018 | Boggavarapu | A47J 31/5251 |
| 2018/0055288 | A1* | 3/2018 | Rose | G01N 33/14 |

FOREIGN PATENT DOCUMENTS

| WO | WO2017186531 A1 | 11/2017 |
|---|---|---|
| WO | WO2018053436 A1 | 3/2018 |

OTHER PUBLICATIONS

The English translation of the International Preliminary Report on Patentability (Chapter I of the Patent Cooperation Treaty), dated Aug. 25, 2021, which was issued by the International Bureau of WIPO in Applicant's corresponding international PCT application having Serial No. PCT/EP2020/052201, filed on Jan. 30, 2020.

The Written Opinion of the International Searching Authority, in English, dated Mar. 17, 2020, which was issued by the International Bureau of WIPO in Applicant's corresponding international PCT application having Serial No. PCT/EP2020/052201, filed on Jan. 30, 2020.

The International Search Report, in English, dated Mar. 17, 2020, which was issued by the International Bureau of WIPO in Applicant's corresponding international PCT application having Serial No. PCT/EP2020/052201, filed on Jan. 30, 2020.

* cited by examiner

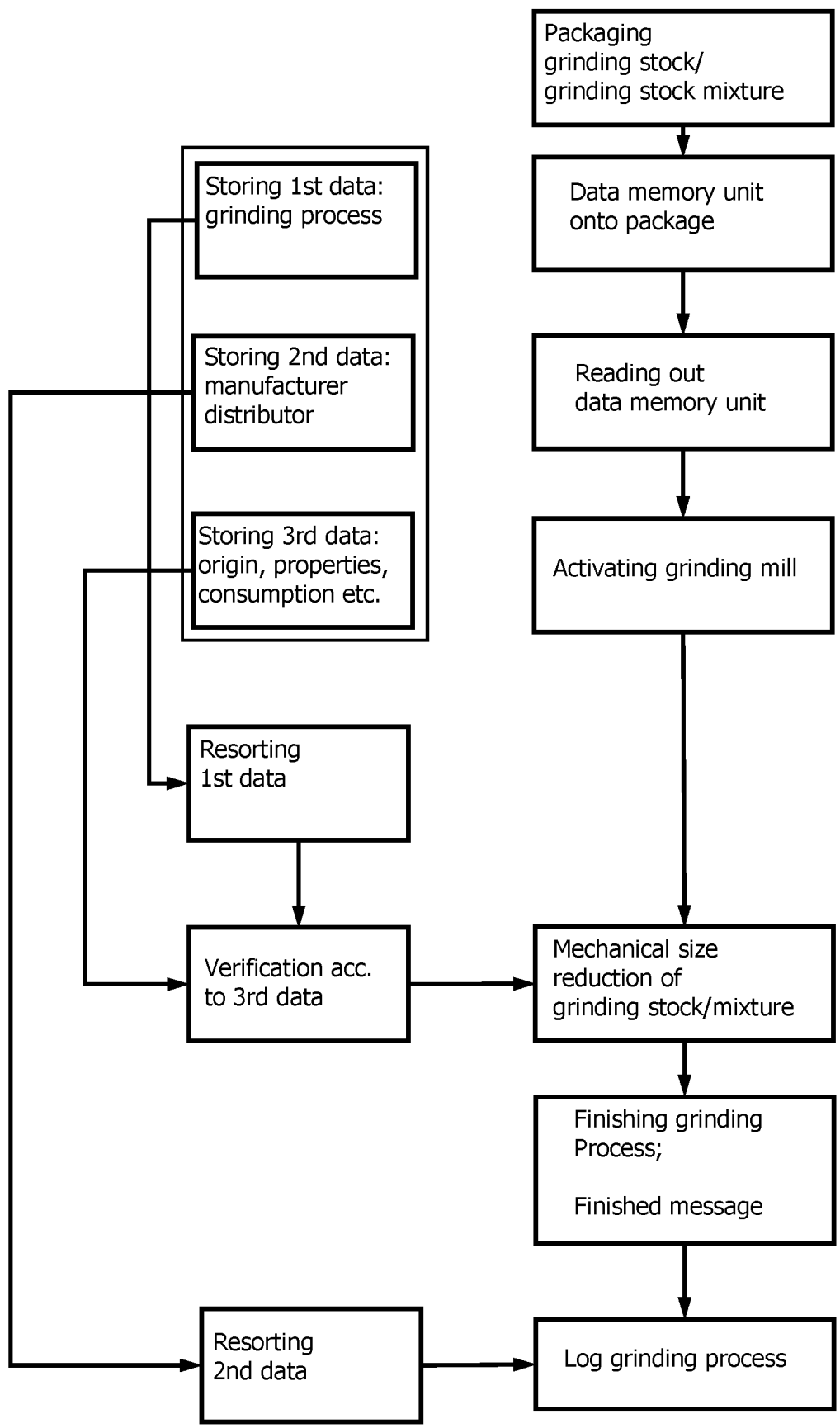

METHOD AND DEVICE FOR THE TREATMENT OF GRANULAR GRINDING STOCK OR GRINDING STOCK MIXTURES

The invention relates to a method and a device for treating granular grinding stock or grinding stock mixtures by way of controlled mechanical size reduction by means of a grinding mill or a combination of several grinding mills according to claim 1 or 9.

From U.S. Pat. No. 7,464,888 B2, an automatic dosing unit for dispensing a particulate product, for example coffee, into a collecting unit is already known, wherein the dosing unit includes a grinding device effective for grinding a product, and an identification device for identifying the size of the collecting unit.

In the method for brewing a beverage by means of a brewing device according to U.S. Pat. No. 9,591,862 B2, a brewing recipe based on a selection of brewing recipes is retrieved and the pump duration is calculated based on a target fluid volume indicated in the brewing recipe. The brewing recipe, which is specific for an identified kind of coffee beans, is retrieved from a local memory or a remote data base of brewing recipes. The identification of a kind of coffee beans may be performed by means of an identifier applied to a package.

A computer implemented method for controlling the brewing of a coffee beverage on the basis of computer readable media is shown by US 2014/0263780 A1.

As to the state of the art with respect to automatic brewing methods for producing hot beverages, attention should also be drawn to US 2018/0000108 A1 and WO 2018/053436 A1.

In the coffee treatment device including the possibility of roasting coffee beans according to DE 10 2016 107 834 A1, there is the possibility of controlling the roasting device, the grinding device and an extraction device by means of a control device. This may be based on external control information. The external control information is receivable by the coffee treatment device. Insofar, there is the possibility of resorting to an RFID reading device.

From the aforementioned, it is the task of the invention to propose a method and an associated device for treating a granular grinding stock or grinding stock mixtures by way of a controlled mechanical size reduction by means of a grinding mill or a combination of several grinding mills, which ensures that the grinding process is executed in an optimum manner, and namely using externally predefined data or data associated with the grinding stock. This allows a faulty grinding stock treatment in terms of an incorrect grain size but also inadmissibly high heating or other damage of the grinding stock or a mixture of grinding stocks to be avoided.

The grinding stock is in particular a dry, granular grinding stock such as seeds, pulses, cereals or spices. Basically, however, the teaching of the invention is not restricted to such a grinding stock. An application with respect to an oil-containing granular stock is likewise conceivable, wherein, concerning this matter, the corresponding grinding mill according to the state of the art needs to be adapted or selected.

BRIEF DESCRIPTION OF THE SEVERAL VIEWS OF THE DRAWINGS(S)

The FIGURE is a flow chart illustrating one embodiment of the method for treating granular grinding stock or grinding stock mixtures of the present invention.

The solution of the task of the invention is performed by a method according to the teaching as per claim 1, and by means of a device according to the feature combination of claim 9, wherein the dependent claims comprise at least appropriate configurations and further developments.

The method or the presented device preferably serves for grinding a granular grinding stock, such as cereals, in smaller quantities for household and catering purposes.

The device for grinding resorts to known grinding mills and is capable of reading out data from a data carrier, for example an RFID chip, in a wireless manner. Furthermore, the device includes the possibility of resorting to a WLAN radio network, an UMTS radio network or another radio network to transmit specific date related to the grinding process into the Cloud but also to download it from there.

A provided RFID reading unit serves the purpose of identifying a packaged, purchased grinding stock or grinding stock mixture. In this respect, in one configuration of the invention, the package of the grinding stock, for example a package bag, may include an RFID chip or a similar information carrier.

The RFID chip contains data relating to the grinding stock and its processing, so that an automatic control of the device with regard to the grinding duration, grinding fineness, etc. may be performed. The data relating to the grinding operation, but also the releasing of the grinding operation itself, and data relating to the producer and/or distributor of the grinding stock are transmittable into the Cloud. On the basis of the obtained and read out data, a statistical evaluation but also a billing in the terms of a license related to the purchased and ground grinding stock which was processed by means of the corresponding device is possible.

Consequently, a correctly portioned packaging of the corresponding grinding stock or the corresponding grinding stock mixture is performed, wherein the grinding stock mixture is composed according to the recipe. Furthermore, a storage of first data for controlling the grinding process in accordance with the properties of the grinding stock and/or the recipe relating to the grinding stock mixture is performed.

Moreover, second data related to the manufacturer and/or distributor of the grinding stock or the grinding stock mixture is stored. Supplementarily, third data about the origin and/or properties and/or minimum consumption periods or shelf life information related to the grinding stock or the grinding stock mixture is stored.

A data memory unit is attached to the package, inserted into the package, applied onto the package or connected to the package, wherein the data memory unit is machine-readable, and in particular is readably optically or via radio interface.

Following this, the grinding mill is automatically activated by means of a grinding mill control unit which is capable of reading out the respective data memory unit of the respective package when the package reaches the proximity of the grinding mill or the device equipped with the grinding mill.

On the basis of the read-out data, a mechanical size reduction of the grinding stock is then carried out. Here, the first data is used together with the verification of information according to the third data.

The grinding process is then finished automatically. In this case, a finished message is issued, wherein the control unit logs the respective grinding process while utilizing the second data in a random-access memory.

In an implemented manner, the data filed in the random-access memory is retrievable via an interface and is available for statistical surveys and/or for the commercial, in particular license-based billing.

The retrieved data is transferred into a central server via the Internet.

In supplying the package to the grinding mill, there is the possibility of performing an automatic opening of the package, such that the quantity of the grinding stock to be supplied per temporal unit is determined and thus the opening size of the package is predefined by means of the first data.

In one configuration of the invention, the grinding mill control unit is in intercommunication with an input device for manually influencing the grinding process.

Furthermore, visualization of the first to third data may be performed by means of a display, wherein the course and the respective state of the grinding process is also representable via the display.

Via the display, disturbances, service instructions and information regarding the third data may also be displayed to the user.

The device according to the invention for the treatment of granular grinding stock or grinding stock mixtures by way of controlled mechanical size reduction by means of a grinding mill or a combination of grinding mills assumes that the at least one grinding mill is located in a housing, wherein within or at the housing, a grinding stock feeding container and a grinding mill control unit are provided. The grinding mill control unit has a first interface for reading in data in a wireless manner from an external data memory.

Furthermore, a second interface is formed for an interconnection with a WLAN, a telecommunication network or the like for transmitting data to an external server.

The device also has an operating and display unit for manually inputting data as well as for displaying data and/or functions.

Via the mentioned WLAN interface, but also the possibility of establishing a Bluetooth connection to a mobile telecommunication device, an individual evaluation of grinding processes, a collection of recipes, an assessment of the grinding stock or the like may be made via an application software that may be installed there.

In a preferred configuration of the invention, a means for forming an opening in a grinding stock package in a targeted manner is formed at or in the grinding stock feeding funnel. This opening may be a mechanical cutting unit defining the opening size while resorting to recipe-specific or grinding stock-specific data, so that only that quantity of grinding stock reaches the grinding mill from the package via the feeding funnel which can be processed per temporal unit at the desired quality.

In an alternative embodiment of the device, the corresponding package container including its content is completely supplied to the grinding stock feeding funnel. At the output side end of the relevant funnel, an adjustable, shutter-like opening is present in this embodiment so as to control the inflow of the grinding stock or the respective grinding stock mixture according to the grinding stock properties in this respect.

The device according to the invention results in conjunction with the presented method in a particularly user-friendly solution in crushing granular grinding stock, wherein the grinding success and thus the quality of the treated grinding stock is secured. Operating errors are likewise excluded according to the invention as is the processing of unsuitable materials or such materials the shelf life of which is exceeded.

In the case that the grinding mill/s is/are driven electromotively, there is the possibility according to the invention to log the grinding process via an acquisition of the respective effective power of the grinding mill motor/s.

If it is determined here that deviations from predefined set point data, i.e. abnormal power peaks have to be recorded, an abnormal grinding process may be concluded. Thus, for example, it is recognizable when the grinding stock includes third-party products or when there are disturbances in the grinding mill itself. If during the provision and packaging of grinding stock, for example, metallic foreign bodies get into the grinding stock, this can be recognized while observing the evaluation of effective power measurement data, and a further utilization, in particular a consumption of the crushed grinding stock can be prevented. The same applies in the event that in a grinding mill including a grinding stone, for example, fragments of it get into the crushed stock.

The invention claimed is:

1. A method for treating granular grinding stock or grinding stock mixtures by way of controlled mechanical size reduction by means of a grinding mill or a combination of several grinding mills, comprising the steps of:
   correctly proportioned packaging of the grinding stock or the grinding stock mixture, wherein the grinding stock mixture is composed according to a recipe;
   storing of first data for controlling the grinding process in accordance with the properties of the grinding stock and/or the recipe of the grinding stock mixture;
   storing of second data related to the manufacturer and/or distributor of the grinding stock or the grinding stock mixture as well as of third data related to the origin and/or properties and/or minimum consumption periods or shelf life information related to the grinding stock or the grinding stock mixture;
   attaching to, inserting into, applying onto or connecting a data memory unit to the package, wherein the data memory unit is machine readable;
   automatically activating the grinding mill by means of a grinding mill control unit which is capable of reading out the respective data memory unit of the respective package, when the package has been transported into the proximity of the grinding mill;
   executing the mechanical size reduction of the grinding stock or the respective grinding stock mixture while resorting to the first data together with a verification of information according to the third data, and
   automatically finishing the grinding process with a finished message, wherein the control unit logs the respective grinding process in a random-access memory while resorting to the second data.

2. The method according to claim 1,
characterized in that
the data filed in the random-access memory is retrieved via an interface and is used for statistical surveys and/or for license-based, commercial billing.

3. The method according to claim 2,
characterized in that
the retrieved data is transferred into a central server via the Internet.

4. The method according to claim 1,
characterized in that
in supplying the package to the grinding mill, an automatic opening of the package is performed, such that the quantity of the grinding stock to be supplied per temporal unit is determined and the opening size is predefined by means of the first data.

5. The method according to claim 1,
characterized in that
the grinding mill control unit is in intercommunication with an input device for manually influencing the grinding process.

6. The method according to claim 1,
characterized in that
by means of a display, the first to third data is optionally visualizable, wherein the course and the respective state of the grinding process is represented via the display.

7. The method according to claim 6,
characterized in that
via the display, disturbances, service instructions and information regarding the third data are displayed to the user.

8. The method according to claim 1,
characterized in that
the grinding stock or the respective grinding stock mixture contains seeds, pulses, cereals, spices or nuts.

9. The method according to claim 1, wherein the data memory unit is optically readable.

10. The method according to claim 1, wherein the data memory unit is readable via radio interface.

* * * * *